United States Patent [19]

Ishizuka et al.

[11] 3,970,500

[45] July 20, 1976

[54] PROCESS FOR SEPARATING A NUMBER OF SHEETS INTO GROUPS

[75] Inventors: Akio Ishizuka; Yasuhiro Ogata, both of Fujimiya, Japan

[73] Assignee: Fuji Photo Film Co., Ltd., Minami-ashigara, Japan

[22] Filed: Dec. 11, 1974

[21] Appl. No.: 531,501

[30] Foreign Application Priority Data

Feb. 19, 1974 Japan.............................. 49-19761

[52] U.S. Cl................................ 156/305; 156/328; 282/DIG. 2; 282/22 R; 282/24 R; 428/194; 260/67 A
[51] Int. Cl.² ........................................... B41L 1/24
[58] Field of Search...................... 260/67 A, 505 C; 282/DIG. 2, 24, 22, 26; 156/305, 290, 291, 297; 428/194; 427/285

[56] References Cited

UNITED STATES PATENTS

| | | | |
|---|---|---|---|
| 3,216,926 | 11/1965 | Kurtz et al. | 260/67 A |
| 3,277,162 | 10/1966 | Johnson | 260/505 C |
| 3,393,925 | 7/1968 | Calvert | 428/194 X |

FOREIGN PATENTS OR APPLICATIONS

| | | |
|---|---|---|
| 2,254,483 | 6/1973 | Germany |

*Primary Examiner*—Ralph S. Kendall
*Attorney, Agent, or Firm*—Sughrue, Rothwell, Mion, Zinn & Macpeak

[57] ABSTRACT

A process for separating a number of sheets into groups of sheets comprising coating an adhesive composition on an edge of a stack of the sheets and fanning the sheets. The adhesive composition contains a naphthalene sulfonic acid-formaldehyde condensation product and an organic acid or an alkali metal salt thereof.

18 Claims, No Drawings

PROCESS FOR SEPARATING A NUMBER OF SHEETS INTO GROUPS

BACKGROUND OF THE INVENTION

1. Field of the Invention

The present invention relates to a process for separating a number of sheets into groups, and an adhesive composition for use therein.

2. Description of the Prior Art

Processes for separating a number of sheets such as a pressure sensitive copying paper into groups are described in U.S. Pat. Nos. 2,711,375; 2,712,507; 2,730,456; 2,730,457; 3,418,250; 3,432,327; etc., for example, and adhesive compositions for use therein are described in detail in Japanese Pat. Publication No. 35696/1971, Japanese Pat. Publication Nos. 40464/1973 and 7634/1975, etc.

In the prior art methods, gelatin, gelatin derivatives, gelatin decomposition products, or mixtures thereof with aqueous emulsions of a resin, i.e., a polymer latex, are used as an adhesive component.

However, since gelatins tend to degrade, and the viscosity thereof varies greatly depending upon the temperature, adhesives containing gelatins are not satisfactory in storage stability, adhesiveness, and separability. In the present specification, the term "separability" designates that the sheets are separated into groups. Thus, when the separability is good, the sheets are easily separated into groups, and when the separability is poor, the sheets are difficult to separate into groups. The latexes which are added for the purpose of improving the adhesiveness decrease the separability, and thus it is desired that the adhesives containing the latexes are further improved.

SUMMARY OF THE INVENTION

An object of the present invention is to provide a process for separating simply and correctly a number of sheets into groups.

Another object of the present invention is to provide an adhesive composition which has excellent storage stability, adhesiveness, separability, and drying rate, and which is used in separating a number of sheets into groups.

These and other objects and advantages of the present invention will be apparent from the following description.

The objects of the invention are attained by using an adhesive composition containing a naphthalene sulfonic acidformaldehyde condensation product and an organic acid or an alkali metal salt of an organic acid.

DETAILED DESCRIPTION OF THE INVENTION

By the process for separating sheets into groups of the present invention is meant that when the cut edge of a stack of a number of sheets, i.e., an edge of a stack of sheets, is coated with an adhesive and fanned or stroked, the sheets of each group are selectively adhered. The process will be explained by reference to the case where the sheets are pressure sensitive copying papers. In this case, the pressure sensitive copying papers are the combination of a sheet produced by coating a microcapsule layer containing a color former on a support (hereinafter referred to as an "A Sheet"), a sheet produced by coating a developing agent layer and the foregoing microcapsule layer on the surface and the back of a support, respectively (hereinafter referred to as a "B Sheet"), and a sheet produced by coating a developing agent layer on a support (hereinafter referred to as a "C Sheet"), or the combination of an A Sheet and a C Sheet.

These pressure sensitive copying papers are assembled in the sequence of, for example, A-C, A-C, A-C . . ., or A-B-B . . . -B-C, A-B-B . . . -B-C, A-B-B . . . -B-C, . . ., and they are cut to thereby produce, for example, a sheaf of slips. When an adhesive composition is coated on the cutting plane, or the edge of the stack, and dried, each A-C or A-B-B . . . -B-C set is selectively adhered and no adhesion occurs between C and A. The adhesion strength of A-C or A-B-B . . . -B-C must be at least sufficient such that these sheets are not peeled apart with simple handling. It is most preferred that no adhesion between C and A occurs at all, i.e., a good separability. Thus, by applying an adhesive composition to pressure sensitive copying papers, the pressure sensitive copying papers are easily separated into groups comprising a certain number of papers which are required for copying.

The naphthalene sulfonic acid-formaldehyde condensation products of the present invention are preferably represented by the following general formula:

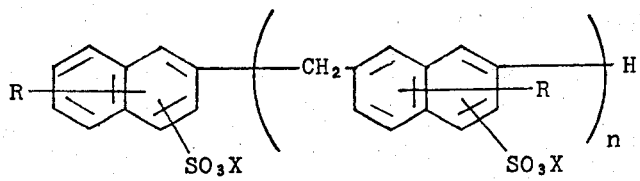

wherein R, which may be the same or different, (a plurality of R groups can be contained in the naphthalene nuclei), is a hydrogen atom or an alkyl group; X is a hydrogen atom, an alkali metal atom, or an ammonium group; and n is an integer.

Those condensation products in which the alkyl group contains 1 to 18 carbon atoms, X is a sodium or potassium atom, or an ammonia group, and $n$ is 1 to 13, are conveniently used and are thus preferred in the present invention. Particularly, those condensation products in which R is a hydrogen atom or an alkyl group containing 1 to 4, particularly 1 to 3 carbon atoms, X is a sodium or potassium atom, and $n$ is 1 to 5, particularly 2 to 5, are preferred. Suitable examples of alkyl groups having 1 to 18 carbon atoms are methyl, ethyl, propyl, isopropyl, n-butyl, hexyl, octyl, undecyl, hexadecyl, etc. Preferable examples of these alkyl groups are methyl, ethyl, propyl, isopropyl and n-butyl and hydrogen is particularly preferred as R. Various compounds represented by the above general formula are known as anionic surface active agents and are readily available.

The organic acid component of the adhesive composition of the present invention is, in general, an acid organic compound. The organic acid preferably is soluble in water in preparing the adhesive composition.

Thus, where the organic acid is watersoluble, the organic acid can be added to the composition as it is, and where the organic acid is water-insoluble, it is added as an alkali metal salt, for example, a sodium salt, a potassium salt, a lithium salt, and the like. Needless to say, when an organic acid is converted into an alkali metal salt thereof even though the organic acid per se is water-soluble, the solubility thereof is increased, and alkali metal salts of organic acids which are soluble in water as well as those which are insoluble in water are included in the present invention. A suitable solubility in water at 25°C for the organic acid or salt thereof can range from not less than about 1% by weight, preferably not less than 5% by weight.

Of the organic acids, those compounds which have at least one group selected from a carboxy group, a sulfone group, or a hydroxy (phenolic) group are preferred. Either aliphatic or aromatic or alicyclic compounds are suitable. Representative examples of these organic acids are mono- or poly-basic carboxylic acids such as formic acid, acetic acid, propionic acid, capric acid, pelargonic acid, methoxy acetic acid, malonic acid, benzoic acid, toluylic acid (ortho, meta, and para), m-hydroxybenzoic acid, m-aminobenzoic acid, salicylic acid, pyromellitic acid, anisilic acid, gallic acid, phthalic acid, and the like; sulfonic acids such as methane sulfonic acid, benzene sulfonic acid, p-toluene sulfonic acid, naphthalene sulfonic acid (both $\alpha$ and $\beta$), and the like; and heterocyclic carboxylic acid compounds containing at least one nitrogen atom in the nucleus such as pyrrolidonecarboxylic acids, e.g., 1-phenyl-2-pyrrolidone-3-carboxylic acid, indolecarboxylic acids, e.g., indole-2-carboxylic acid, and 1-methylindole-2,3-dicarboxylic acid, thiazolecarboxylic acids, e.g., 2-benzothiazolecarboxylic acid, imidazolecarboxylic acids, e.g., 4-benzoimidazolecarboxylic acid, 4-isopropyl proline, and the like. Of these organic acids, aliphatic carboxylic acids such as formic acid and acetic acid, heterocyclic carboxylic acid compounds such as pyrrolidonecarboxylic acid, and aromatic sulfonic acids such as p-toluenesulfonic acid are particularly effective because they are highly hygroscopic.

Preferably, the adhesive composition of the present invention contains about 5 to 40% by weight, preferably 7 to 30% by weight, of the naphthalene sulfonic acid-formaldehyde condensation product and about 1 to 100% by weight, preferably 5 to 40% by weight, of the organic acid or alkali metal salt based on the weight of the naphthalene sulfonic acidformaldehyde condensation product.

The adhesive composition of the present invention can contain, if desired, additional components. Examples of these components are polymer material emulsions. The term "polymer material emulsion" designates a liquid in the state in which a water-insoluble or non-easily water-soluble polymer material is emulsified in water. These emulsions are composed of polymer materials capable of forming a film when dried and include the so-called latexes. The polymer material emulsion which can be used in the present invention generally has a solid content of 10 to 70% by weight, a particle diameter of 0.1 to 5.0 $\mu$, and a viscosity of 0.5 to 1000 poises.

Methods for the production of the polymer material emulsion include emulsion polymerization and emulsifying a polymer material solution. Emulsions produced by any one of the above methods can be employed in the present invention. These methods for the production of emulsions are described in detail in, for example, Muroi, *Chemistry of Polymer Latex*, published by Kobunshi Kankokai, Kanbara et al., *Handbook of Synthetic Rubber*, published by Asakura Shoten, Phillip Sharman, *Emulsion Science*, published by Academic Press Incorporated, London, etc.

The polymer material can be chosen substantially irrespective of the molecular weight of the polymer material. Examples of latexes obtained by emulsion polymerization are styrene-butadiene rubber based latexes comprising, for example, 25 to 75 parts by weight of styrene and 75 to 25 parts by weight of butadiene, preferably 65 to 40 parts by weight of styrene and 35 to 60 parts by weight of butadiene (those polymers which contain 1 to 6 parts by weight of acrylic acids or methacrylic acids and which are carboxy-modified are more preferred), butadiene-acrylonitrile rubber based latexes comprising, for example, 75 to 60 parts by weight of butadiene and 25 to 40 parts by weight of acrylonitrile, a chloroprene based latex, vinyl acetate based latexes (for example, polyvinyl acetate, copolymers of vinyl acetate and acrylic acids or methacrylic acids such as methyl acrylate, ethyl acrylate, or methyl methacrylate, and with a vinyl acetate-acrylic acid ester copolymer being particularly preferred), acrylic based latexes (for example, acrylic acid ester copolymers such as a methacrylic acid methyl ester-acrylic acid ethyl ester copolymer, an acrylic acid methyl ester-acrylic acid ethyl ester copolymer, a methacrylic acid methyl ester-acrylic acid butyl ester copolymer, and an acrylic acid methyl ester-acrylic acid ethyl ester-acrylic acid butyl ester copolymer, unsaturated monomer-acrylic acid ester copolymers such as a styrene-acrylic acid ester copolymer, a butadiene-acrylic ester copolymer, a styrene-methacrylic acid ester copolymer and, a butadiene-methacrylic acid ester copolymer, and a styrene- or butadiene-acrylic acid ester copolymer which comprises 10 to 80 parts by weight of styrene and 90 to 20 parts by weight of acrylic acid ester, preferably 40 to 60 parts by weight of styrene and 60 to 40 parts by weight of acrylic acid ester, or 25 to 50 parts by weight of butadiene and 75 to 50 parts by weight of acrylic acid ester, preferably 30 to 50 parts by weight of butadiene and 70 to 50 parts by weight of acrylic acid ester is particularly preferred, and particularly those compounds which are carboxy-modified are preferred), vinyl chloride based latexes, and the like. Emulsions produced by dissolving a polymer material in a solvent and further emulsifying in water are a polybutadiene emulsion, a polyisoprene emulsion, a butyl rubber emulsion, and the like. Particularly useful polymer material emulsions are the styrene-butadiene based latexes and acryl based latexes, and those compounds which are carboxy-modified are particularly preferred.

The polymer material comprises about 10 to 300% by weight, particularly 50 to 200% by weight, of total weight of the adhesive composition of the present invention.

The adhesive composition can contain, if desired, water-soluble binders such as natural polymer compounds, e.g., proteins such as gelatin, gum arabic, albumin, casein, and the like, celluloses such as carboxymethyl cellulose, hydroxyethyl cellulose, and the like, saccharides such as agar, sodium alginate, starch, carboxymethyl starch, and the like, or synthetic polymer compounds, e.g., polyvinyl alcohol, polyvinyl pyrrolidone, polyacrylic acid, and polyacrylamide, or the like. Furthermore, the adhesive composition can contain cationic, anionic, non-ionic or amphteric surface active agents such as sodium dodecyl benzene sulfonate trimethyloctadecyl ammonium chloride, sodium oleate, a polyoxyethylene alkylaryl ether, polyethylene glycol dodecylphenyl ether sorbitan monooleate, an alkyl betaine, an alkyl imidazole, sodium lignin sulfonate, and the like. The water-soluble binder can be present in a proportion of about 0.5 to 100% by weight, particularly 0.5 to 10% by weight, and the surface active agent can be present in a proportion of about 0.1 to 5% by weight, each based on the weight of the condensation product.

The microcapsules for use in pressure sensitive copying papers can be easily produced using well-known methods. Since the concentration of the color former can be easily determined on dissolving the color former in the solvent employed in the production of the microcapsules, the present invention is not restricted in terms of microcapsule production methods at all. Microcapsules can be produced according to, for example, the coacervation method as described in U.S. Pat. Nos. 2,800,457; 2,800,458; 3,041,289; 3,687,865; etc., the interfacial polymerization method as described in U.S. Pat. Nos. 3,492,380; 3,577,515; British Patent Nos. 950,443; 1,046,409; 1,091,141; etc., internal polymerization method as described in British Pat. No. 1,237,498, French Pat. Nos. 2,060,818; 2,090,862; etc., external polymerization method as described in British Pat. No. 989,264, Japanese Pat. Publication Nos. 12380/1962, 14327/1962, 29483/1970, 7313/1971, 30282/1971, etc., and the like.

Solvents for use in dissolving the color former in the present invention are not limited and thus any hitherto used solvent can be employed. Typical examples of suitable solvents are aromatic synthetic oils such as alkylated naphthalene, alkylated biphenyl, hydrogenated terphenyl, alkylated diphenyl methane, and the like (wherein the number of carbon atoms in the alkyl group is about 1 to 5, and the number of alkyl groups is 1 to 4), petroleum fractions such as kerosene, naphtha, paraffin, and the like, aliphatic synthetic oils such as chlorinated paraffin, and the like, vegetable oils such as cotton seed oil, soy bean oil, linseed oil, and the like, and mixtures thereof. The concentration of the color former solution is not particularly restricted, and thus microcapsules can be easily produced by one skilled in the art using a concentration of the color former solution (about 1 to 10%) as used in conventional pressure sensitive copying papers.

The color former of the present invention is a substantially colorless compound which forms a color when brought in contact with a solid acid and the color former can be defined as an electron accepting and substantially colorless organic compound. The type and characteristics of the color former do not materially influence the present invention because the composition of the adhesive is important in the present invention. Thus, any kind of color former can be used. For example, triarylmethane compounds, diarylmethane compounds, xanthene compounds, thiazine compounds, spiropyran compounds and the like can be used.

Representative examples of color formers are listed below.

Examples of triphenylmethane compounds are 3,3-bis(p-dimethylaminophenyl)-6-dimethylaminophthalide, i.e., Crystal Violet lactone, 3,3-bis(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis-(1,2-dimethylindol-3-yl)-5-dimethylaminophthalide, 3,3-bis-(1,2-dimethylindol-3-yl)-6-dimethylaminophthalide, 3,3-bis-(9-ethylcarbazol-3-yl)-5-dimethylaminophthalide, 3,3-bis-(2-phenylindol-3-yl)-5-dimethylaminophthalide, 3-p-dimethylaminophenyl-3-(1-methylpyrrol-2-yl)-6-dimethylaminophthalide, and the like.

Examples of diphenylmethane compounds are 4,4'-bis-dimethylaminobenzhydrine benzyl ether, N-halophenyl leuco Auramine, N-2,4,5-trichlorophenyl leuco Auramine, and the like.

Examples of xanthene compounds are Rhodamine-B-anilinolactam, Rhodamine-(p-nitroanilino)lactam, Rhodamine-B-(p-chloroanilino)lactam, 7-dimethylamino-2-methoxyfluoran, 7-diethylamino-2-methoxyfluoran, 7-diethylamino-3-chloro-2-methylfluoran, 7-diethylamino-3-(acetylmethylamino)fluoran, 7-diethylamino-3-(dibenzylamino)fluoran, 7-diethylamino-3-(methylbenzylamino)fluoran, 7-diethylamino-3-(chloroethyl-methylamino)fluoran, 7-diethylamino-3-(diethylamino)fluoran, and the like.

Examples of thiazine compounds are benzoyl leuco Methylene Blue, p-nitrobenzyl leuco Methylene Blue, and the like.

Examples of spiro compounds are 3-methyl-spiro-dinaphthopyran, 3-ethyl-spiro-dinaphthopyran, 3,3-dichlorospiro-dinaphthopyran, 3-benzyl-spiro-dinaphthopyran, 3-methylnaphtho-(3-methoxybenzo)-spiropyran, 3-propyl-spiro-dibenzodipyran, and the like.

These color formers can be used alone or as mixtures comprising two or more thereof.

Thus, a microcapsule coating liquid can be obtained. Preferably, the microcapsule is mono-nuclear, but the objects of the present invention can be attained with multi-nuclear capsules. The size of the microcapsules is generally about 1 to 500 $\mu$, and preferably about 2 to 50 $\mu$. In the present invention, capsules having about the same size can be used.

The microcapsule coating liquid can be coated on a support as it is since it is generally a capsule dispersion liquid. A binder such as a latex, e.g., a styrene-butadiene rubber latex, and the like, or a water-soluble polymeric compound, e.g., starch, carboxymethyl cellulose, polyvinyl alcohol, gum arabic, casein, gelatin, and the like can be added and coated, with or without a separation of the microcapsules from the capsule dispersion. Furthermore, a capsule reinforcing agent such as a fine powder of cellulose as described in U.S. Pat. No. 2,711,375, a fine powder of a polymer as described in U.S. Pat. No. 3,625,736, a fine powder of starch as described in British Pat. No. 1,232,347, and microcapsules containing no color former as described in British Pat. No 1,235,991 can be added to the capsule coating liquid or a capsule layer. It is desirable that the capsule reinforcing agent is present scattered in the capsule layer or on the surface thereof rather than in a layer form.

A paper, a plastic film, a resin coated paper, a synthetic paper, and the like can be used as the support. The microcapsule layer is coated on at least one side of the support, or on or under the developer layer as described hereinafter, or on the side of the support opposite the developer layer.

In the present specification, the developer designates a solid acid, and more specifically an electron accepting solid acid. Examples of developers are described in the above-described patents, and include, for example, clays, e.g., acid clay, activated clay, attapulgite, and the like, organic acids, e.g., aromatic carboxy compounds such as salicylic acid, aromatic hydroxy compounds such as p-t-butylphenol, p-t-amylphenol, o-chlorophenol, m-chlorophenol, p-chlorophenol, and the like, or metal salts thereof such as the zinc salt and the like, mixtures of an organic acid and a metal compound, e.g., zinc oxide, acid polymers, e.g., a phenol-formaldehyde resin, and a phenol-acetylene resin, and the like. Suitable developers are described in U.S. Pat. Nos. 3,501,331; 3,669,711; 3,427,180; 3,455,721; 3,516,845; 3,634,121; 3,672,935; 3,722,120; 3,772,052; 3,834,929; 3,874,895; 3,856,533; Japanese Pat. Application Nos. 84539/1970, 93245/1970, 93247/1970, 94874/1970, 109872/1970, 112040/1970. Japanese Patent Publication Nos. 33209/73, 13451/74, 27134/74; 13454/74; etc.

The developer can be coated on the support together with a binder. Suitable supports are described above. Latexes such as a styrene-butadiene rubber latex, a styrene-butadieneacrylonitrile latex, a styrene-maleic acid copolymer latex, and the like; water-soluble natural polymeric compounds such as proteins, e.g., gelatin, gum arabic, albumin, casein, etc., celluloses, e.g., carboxymethyl cellulose, hydroxyethyl cellulose, etc., saccharides, e.g., agar, sodium alginate, starch, carboxymethyl starch, etc., and the like; water-soluble synthetic polymeric compounds such as polyvinyl alcohol, polyvinyl pyrrolidone, polyacrylic acid, polyacrylamide, and the like; organic solvent-soluble polymeric compounds such as nitrocellulose, ethylcellulose, a polyester resin, polyvinyl acetate, polyvinylidene chloride, a vinyl chloride-vinylidene chloride copolymer, and the like; etc., can be used as the binder. These binders can also be used as a binder for the capsule dispersion liquid. In addition, hitherto known additives can be added to the developer layer.

The naphthalene sulfonic acid-formaldehyde condensation product is considered to be a most excellent component in that it is not only completely free from the disadvantages of the gelatins, but it provides an adhesive with separability. However, with the naphthalene sulfonic acid-formaldehyde condensation product alone, the adhesion strength is not sufficient, while with the polymer material emulsion alone, the adhesion strength is high, but separability is poor. To the contrary, the adhesive composition containing the naphthalene sulfonic acid-formaldehyde condensation product and the organic acid is quite excellent in adhesion strength and separability as compared with gelatin, gelatin derivatives, latexes, naphthalene sulfonic acid-formaldehyde condensation product, and polymer emulsions, either alone or in combination. That is, the adhesive composition of the present invention is far superior to conventional adhesives, and thus the range of the use can be increased.

The effects of the present invention which are obtained by the use of the adhesive composition containing the naphthalene sulfonic acid-formaldehyde condensation product and the organic acid, will be explained in detail by reference to the following examples although the present invention is not intended to be construed as being limited to these examples.

The effects of the present invention were demonstrated with the following A Sheet, B Sheet, and C Sheet. All parts, percents, ratios and the like are by weight unless otherwise indicated.

Preparation of A Sheet

In 400 parts of water at 40°C, 10 parts of pig skin acid treated gelatin and 10 parts of gum arabic were dissolved, and 0.2 part of Turkey red oil was added as an emulsifier. In the resulting solution, 40 parts of a color former oil was dispersed and emulsified. The color former oil was produced by dissolving 2% Crystal Violet lactone in an oil comprising 4 parts of isopropyl naphthalene and 1 part of kerosene.

When the average size of the droplets became 5 microns, the emulsification was stopped. Water at 40°C was added to make the total weight to 900 parts and stirring was continued. At this time, care was taken not to decrease the liquid temperature below 40°C. Coacervation was caused by adding a 10% acetic acid aqueous solution and by adjusting the pH of the liquid to 4.0 to 4.2. The stirring was further continued and after 20 minutes, the liquid was cooled with ice water to thereby gel the coacervation film deposited on the droplets. When the liquid temperature became 20°C, 7 parts of a 37% formaldehyde aqueosu solution was added. At 10°C, 40 parts of a 7% aqueous solution of the sodium salt of carboxymethyl cellulose was added, and then a 15% aqueous solution of sodium hydroxide was added to thereby adjust the pH to 9. At this time, the addition of sodium hydroxide was carried out with the greatest care. The liquid was heated for 20 minutes while stirring to thereby increase the liquid temperature to 50°C.

The thus obtained microcapsule liquid was adjusted to 30°C and then the liquid was coated on a paper of 40 g/m$^2$ in an amount (solid content) of 6 g/m$^2$ and dried.

In using other color formers, the same procedure as described above was employed.

Preparation of B Sheet

To 150 parts of water was added 6 parts of a 20% sodium hydroxide aqueous solution. With stirring, 50 parts of activated clay was gradually added. After stirring for 30 minutes, 20 parts of a styrene-butadiene latex (concentration: 48% by weight; pH: 8.5; viscosity: 250 c.p.; average particle size: 0.16 $\mu$) was added and the composition was mixed uniformly. The resulting coating liquid was coated on a paper of 40 g/m$^2$ in an amount of 8 g/m$^2$ (solid content), which was, after drying, subjected to calendering. Then, on the opposite side of the support, the same capsule coating liquid as used in preparing A Sheet was coated in an amount of 6 g/m$^2$ (solid content) and dried.

Preparation of C Sheet

The same developer (activated clay) coating liquid as used in preparing B Sheet was coated on a paper of 110 g/m$^2$ in an amount of 8 g/m$^2$ (solid content) and after drying, subjected to calendering.

Test Procedure 50 sets of the thus obtained A, B, and C Sheet in the order of A-B-B-B-C were stacked and cut to a size of 3 cm × 5 cm. To the cut edge of the stack an adhesive was coated in an amount of 5 g/100 cm$^2$ and dried at room temperature (about 20 ~ 30°C). One hour after the drying, the adhesion strength and the separability were measured using the following methods.

Adhesion Strength

The adhesion strength (g) was measured using a tensile strength tester (trade name: Strograph M type, produced by Toyo Seiki Seisakujo). The measuring conditions were as follows:

| | |
|---|---|
| Load Capacity | 1 kg |
| Tension Speed | 150 mm/minute |
| Load Detector | U gauge type load convertor |
| Recorder | Feed speed 200 mm/minute |

Separability

| | |
|---|---|
| No adhesion between C and A Sheets | 100 |
| Slightly adhered, but easily peeled apart | 80 |
| Adhered and peeled apart with difficulty | 60 |
| Completely adhered and not peeled apart at all (separation is impossible) | 0 |

EXAMPLE 1

To 10 parts of the sodium salt of the naphthalene sulfonic acid-formaldehyde condensation product represented by the formula:

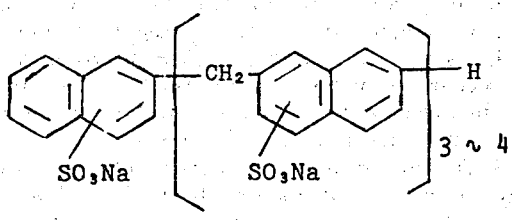

was added 8 parts of a modofied styrene-butadiene copolymer latex (solid content: 48% by weight; pH: 6.8; viscosity: 97 c.p. at 25°C; particle size: 0.1 to 0.15 μ). After adding 2 parts of sodium sulfate, a 20% aqueous solution of pyrrolidonecarboxylic acid sodium salt was added in the amounts as indicated in Table 1 to prepare adhesive compositions. The adhesion strength and separability between A-B, B-B, and B-C were measured by the above-described test methods.

COMPARISON EXAMPLE 1

The procedure of Example 1 was repeated with the exception that the sodium salt of naphthalene sulfonic acidformaldehyde condensation product was not used, and thus an adhesive composition for comparison was produced.

COMPARISON EXAMPLE 2

The same sodium salt of naphthalene sulfonic acid-formaldehyde condensation product as used in Example 1 was added in the amounts as indicated in Table 2 to prepare adhesive compositions.

The results on adhesion strength and separability in Example 1 and Comparison Example 1 are shown in Table 1, and the results on adhesion strength and separability in Comparison Example 2 are shown in Table 2.

TABLE 1

| Solid Concen-tration | Properties | 20% Aqueous Solution of Pyrrolidone-carboxylic Acid Salt (parts) | | | | |
|---|---|---|---|---|---|---|
| | | 5 | 10 | 15 | 20 | 0 |
| 20% | Adhesion Strength (g) | | | | | |
| | A-B | 428 | 441 | 496 | 544 | 365 |
| | B-B | 397 | 424 | 509 | 545 | 317 |
| | B-C | 291 | 351 | 448 | 518 | 201 |
| | Separability | 100 | 100 | 100 | 100 | 100 |

TABLE 2

| Adhesion Strength (g) | Concentration of Condensation Product (% by weight) | |
|---|---|---|
| | 12.6 | 20 |
| A-B | 6 | 21 |
| B-B | 6 | 22 |
| B-C | 6 | 19 |
| Separability | 100 | 100 |

As is apparent from the above results, pyrrolidonecarboxylic acid sodium salt is effective in increasing the adhesion strength particularly between B and C. Thus, a small difference in the adhesion strength between A and B, B and B, and B and C results, and quite good results can be obtained.

EXAMPLE 2

The procedure of Example 1 was repeated with the exception that 10 parts of a 20% aqueous solution of potassium acetate was used in place of the pyrrolidonecarboxylic sodium salt, and thus an adhesive composition was obtained. The adhesion strength and separability are shown below.

| Adhesion Strength | (g) |
|---|---|
| | 430 |
| | 404 |
| | 336 |
| Separability | 100 |

EXAMPLE 3

The procedure of Example 1 was repeated with the exception that 5 parts of a 20% aqueous solution of sodium p-toluene sulfonate was used in place of the pyrrolidonecarboxylic acid sodium salt, and thus an adhesive composition was obtained. The adhesion strength and separability are shown below.

| Adhesion Strength | (g) |
|---|---|
| | 413 |
| | 380 |
| | 285 |
| Separability | 100 |

EXAMPLE 4

After dissolving 5 parts of a sodium salt of naphthalene sulfonic acid-formaldehyde condensation product ($n = 5 \sim 6$; $R = H$) in 49 parts of water, 1 part of sodium sulfate was added and dissolved. Then, 7.5 parts of a modified methyl methacrylateethyl acrylate copolymer latex (solid content: 45% by weight; pH: 3.0; viscosity: 600 c.p.; particle size: 0.05 to 0.15 μ) was added. In addition, 2 parts of a 10% polyvinyl alcohol (average degree of polymerization: 500; degree of saponification: 89%) aqueous solution and 11 part of pyrrolidonecarboxylic acid sodium salt (solid content: 15%) were added to prepare an adhesive composition.

COMPARISON EXAMPLE 3

The procedure of Example 4 was repeated except no pyrrolidonecarboxylic acid sodium salt was used, and thus an adhesive composition was obtained.

The results on adhesion strength and separability in Example 4 and Comparison Example 3 are shown in Table 3.

TABLE 3

| Adhesion Strength (g) | Example 4 | Comparison Example 3 |
|---|---|---|
| A-B | 488 | 433 |
| B-B | 476 | 405 |
| B-C | 457 | 352 |
| Separability | 100 | 100 |

While the invention has been described in detail and with reference to specific embodiments thereof, it will be apparent to one skilled in the art that various changes and modifications can be made therein without departing from the spirit and scope thereof.

What is claimed is:

1. A process for separating a number of pressure sensitive copying papers into groups which comprises (1) coating an adhesive composition comprising a naphthalene sulfonic acid-formaldehyde condensation product and at least one member selected from the group consisting of an organic acid and an alkali metal salt thereof, on an edge of a stack assembly of said copying papers and then (2) fanning said copying papers; said naphthalene sulfonic acid-formaldehyde condensation produce comprising about 5 to 40% by weight of the adhesive composition, said organic acid or alkali metal salt thereof being present in an amount of about 1 to 100% by weight of said naphthalene sulfonic acid-formaldehyde condensation product, and said organic acid is selected from the group consisting of a mono- or poly-basic carboxylic acid, a sulfonic acid, and a heterocyclic carboxylic acid compound containing at least one nitrogen atom in the heterocyclic nucleus.

2. The process according to claim 1, wherein the naphthalene sulfonic acid-formaldehyde condensation product is represented by the formula:

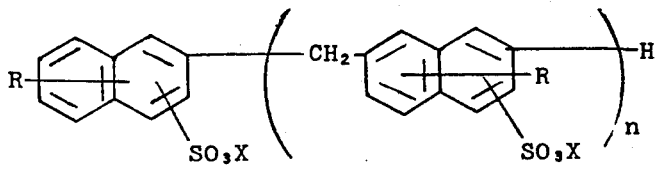

wherein R, which may be the same or different and a plurality of which may be present on the naphthalene nuclei, is a hydrogen atom or an alkyl group; X is a hydrogen atom, an alkali metal atom, or an ammonium group; and $n$ is an integer.

3. The process according to claim 2, wherein R is an alkyl group containing 1 to 4 carbon atoms.

4. The process adhesive composition according to claim 2, wherein X is a sodium atom.

5. The process according to claim 2, wherein X is a potassium atom.

6. The process according to claim 2, wherein $n$ is an integer of from 1 to 5.

7. The process according to claim 1, wherein the organic acid is an aliphatic carboxylic acid.

8. The process according to claim 7, wherein the aliphatic carboxylic acid is formic acid.

9. The process according to claim 1, wherein the organic acid is a heterocyclic carboxylic acid compound.

10. The process according to claim 9, wherein the heterocyclic carboxylic acid compound is pyrrolidonecarboxylic acid.

11. The process according to claim 1, wherein the organic acid is an aromatic sulfonic acid.

12. The process according to claim 11, wherein the aromatic sulfonic acid is p-toluenesulfonic acid.

13. The process according to claim 1, wherein said adhesive composition includes a polymer emulsion.

14. The process according to claim 13, wherein the polymer emulsion has a solid content of about 10 to 70% by weight, a particle size of about 0.1 to 5.0 $\mu$, and a viscosity of about 0.5 to 1000 poises.

15. The process according to claim 13, wherein the polymer emulsion comprises about 10 to 300% by weight of the adhesive composition.

16. The process according to claim 1, wherein said adhesive composition includes a water-soluble binder in a proportion of about 1 to 20% by weight based upon the weight of the naphthalene sulfonic acid-formaldehyde condensation product.

17. The process according to claim 16, wherein the water-soluble binder is selected from the group consisting of a protein, a cellulose, a saccharide, and a synthetic polymer.

18. The process according to claim 1, wherein said adhesive composition includes a surface active agent in a proportion of about 0.1 to 5% by weight based upon the weight of the naphthalene sulfonic acid-formaldehyde condensation product.

* * * * *